US012643604B2

(12) United States Patent
    Hong

(10) Patent No.:     US 12,643,604 B2
(45) Date of Patent:        Jun. 2, 2026

(54) STEERING ANGLE SENSOR

(71) Applicant: Robert Bosch GmbH, Stuttgart (DE)

(72) Inventor: Zhichao Hong, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 958 days.

(21) Appl. No.: 17/755,188

(22) PCT Filed: Oct. 28, 2020

(86) PCT No.: PCT/EP2020/080211
     § 371 (c)(1),
     (2) Date: Apr. 22, 2022

(87) PCT Pub. No.: WO2021/083916
     PCT Pub. Date: May 6, 2021

(65) Prior Publication Data
     US 2022/0396311 A1      Dec. 15, 2022

(30) Foreign Application Priority Data
     Oct. 31, 2019   (CN) .......................... 201921857889.X

(51) Int. Cl.
     *B62D 15/02*          (2006.01)
(52) U.S. Cl.
     CPC ................................ *B62D 15/0215* (2013.01)
(58) Field of Classification Search
     CPC .. B62D 15/0215; B62D 15/021; B62D 15/02;
                                              B62D 15/022
     See application file for complete search history.

(56) References Cited

U.S. PATENT DOCUMENTS 7,445,451 B2 * 11/2008 Tanaka .................. B60R 16/027
                                                     439/15
7,868,611 B2 * 1/2011 Sano ........................ G01B 7/30
                                                    324/207.25

(Continued)

FOREIGN PATENT DOCUMENTS

KR     10-2014-0080880 A      7/2014

OTHER PUBLICATIONS

Machine translation of KR 20140080880 (Cho Jul. 1, 2014) from https://worldwide.espacenet.com/ (Year: 2014).*

(Continued)

*Primary Examiner* — Valentin Neacsu
*Assistant Examiner* — Michael R Stabley
(74) *Attorney, Agent, or Firm* — Maginot, Moore & Beck LLP

(57)                ABSTRACT

A steering angle sensor for measuring the rotation angle of a motor vehicle steering wheel includes a master gear driven by the main rotating shaft of the motor vehicle steering wheel, first and second gears meshed with the master gear, a printed circuit board, a first casing, and a second casing. The first and second casings are fixedly installed together, and an accommodating space is formed between the two casings to accommodate the master gear, the first and second gears, and the printed circuit board. The master gear is rotatably connected with at least one of the first and second casings, and the first and second gears are rotatably accommodated in the accommodating space. The first casing is provided with an isolated space, and the printed circuit board is fixedly installed in the isolated space to inhibit water from entering the isolated space to damage the printed circuit board.

14 Claims, 2 Drawing Sheets

(56)     References Cited

U.S. PATENT DOCUMENTS

| | | | | | |
|---|---|---|---|---|---|
| 8,000,860 | B2 * | 8/2011 | Wu | ........................... | G01D 5/04 |
| | | | | | 180/443 |
| 8,813,578 | B2 * | 8/2014 | Kaess | ...................... | B62D 6/10 |
| | | | | | 324/207.2 |
| 8,963,543 | B2 * | 2/2015 | Moldenhauer | ............ | G01P 3/00 |
| | | | | | 324/207.2 |
| 9,182,452 | B2 * | 11/2015 | Kimura | ................... | G01R 31/40 |
| 9,297,670 | B2 * | 3/2016 | Ishimasa | ................... | G01D 5/12 |
| 9,371,046 | B2 * | 6/2016 | Utsunomiya | ......... | B60R 16/027 |
| 9,500,543 | B2 * | 11/2016 | Lee | ........................... | B62D 6/10 |
| 9,821,846 | B2 * | 11/2017 | Schoepe | ................... | G01D 5/14 |
| 10,259,499 | B2 * | 4/2019 | Adachi | ............... | B62D 15/022 |
| 10,345,171 | B2 * | 7/2019 | Hur | ......................... | G01D 5/145 |
| 2008/0249683 | A1 | 10/2008 | Wu et al. | | |
| 2014/0017542 | A1 * | 1/2014 | Suzuki | ............... | H01M 50/503 |
| | | | | | 429/99 |
| 2018/0120182 | A1 * | 5/2018 | Hur | ......................... | G01L 3/104 |
| 2019/0004152 | A1 * | 1/2019 | Wang | .................... | G01S 7/4816 |
| 2020/0114967 | A1 * | 4/2020 | Nakajima | ............ | B62D 15/021 |
| 2020/0180685 | A1 * | 6/2020 | Suzuki | ................ | B62D 5/0412 |

OTHER PUBLICATIONS

International Search Report corresponding to PCT Application No.
PCT/EP2020/080211, mailed Jan. 29, 2021 (4 pages).

\* cited by examiner

STEERING ANGLE SENSOR

This application is a 35 U.S.C. § 371 National Stage Application of PCT/EP2020/080211, filed on Oct. 28, 2020, which claims the benefit of priority to Serial No. CN 201921857889.X, filed on Oct. 31, 2019 in China, the disclosures of which are incorporated herein by reference in their entirety.

The present disclosure relates to the technical field of sensors, and in particular relates to a steering angle sensor for measuring the rotation angle of an auto steering wheel.

BACKGROUND

A steering angle sensor of the prior art comprises a master gear, a gearwheel and a pinion. The main rotating shaft of an auto steering wheel drives the master gear to rotate and the master gear drives the gearwheel and the pinion to rotate through meshing structures. However, the steering angle sensors of the prior art are not waterproof.

SUMMARY

In view of this, the present disclosure provides a steering angle sensor, thus solving or at least alleviating the above-mentioned problem in the prior art.

First, according to one aspect of the present disclosure, a steering angle sensor for measuring the rotation angle of an auto steering wheel is provided. The steering angle sensor comprises a master gear driven by the main rotating shaft of the auto steering wheel, a first gear and a second gear meshed with the master gear, a printed circuit board, a first casing and a second casing. The first casing and the second casing are fixedly installed together, and an accommodating space is formed between the two casings to accommodate the master gear, the first gear, the second gear and the printed circuit board. The master gear is rotatably connected with at least one of the first casing and the second casing, and the first gear and the second gear are rotatably accommodated in the accommodating space. The first casing is provided with an isolated space, and the printed circuit board is fixedly installed in the isolated space to prevent water from entering the isolated space to damage the printed circuit board.

According to one feasible embodiment, the first casing is fixedly provided with an isolating member, and the isolated space is formed by the isolating member and the first casing.

According to one feasible embodiment, the isolating member and the first casing are integrated together.

According to one feasible embodiment, the isolating member is a separately formed member and is installed on the first casing to form the isolated space.

According to one feasible embodiment, the isolating member is fixed onto the first casing by use of at least one of a fastener, a paste, a screw and a groove.

According to one feasible embodiment, the installation gap between the isolating member and the first casing is sealed by use of rubber and the interference fit method or is sealed by use of glue and/or a seal strip.

According to one feasible embodiment, the isolating member is a sheet having a roughly L-shaped, U-shaped, semicircular and/or curved cross-section.

According to one feasible embodiment, a first sensing chip and a second sensing chip are arranged on the printed circuit board, and the isolating member is provided with a through-hole in the position corresponding to the first sensing chip and the second sensing chip.

According to one feasible embodiment, a sealing member is provided between the isolating member and the printed circuit board and the sealing member is arranged around the through-hole.

According to one feasible embodiment, the sealing member is made of silica gel.

According to one feasible embodiment, at least one of the first casing and the second casing is provided with a drainage hole.

The first casing is provided with an isolated space for accommodating the printed circuit board, thus preventing water from entering the steering angle sensor to damage the printed circuit board and guaranteeing that the steering angle sensor can work normally even in the case of water. Therefore, the steering angle sensor provided according to the design of the present disclosure has a wider scope of application than the prior art.

BRIEF DESCRIPTION OF THE DRAWINGS

The following will further describe in detail the technical solution of the present disclosure in combination with the drawings and embodiments. However, the drawings are designed only for the purpose of interpretations and are intended to conceptually illustrate the structure here. Therefore, it is unnecessary to plot the drawings according to the scale.

DETAILED DESCRIPTION

The following gives exemplary embodiments to describe the present utility model disclosure in detail.

Figure 1:
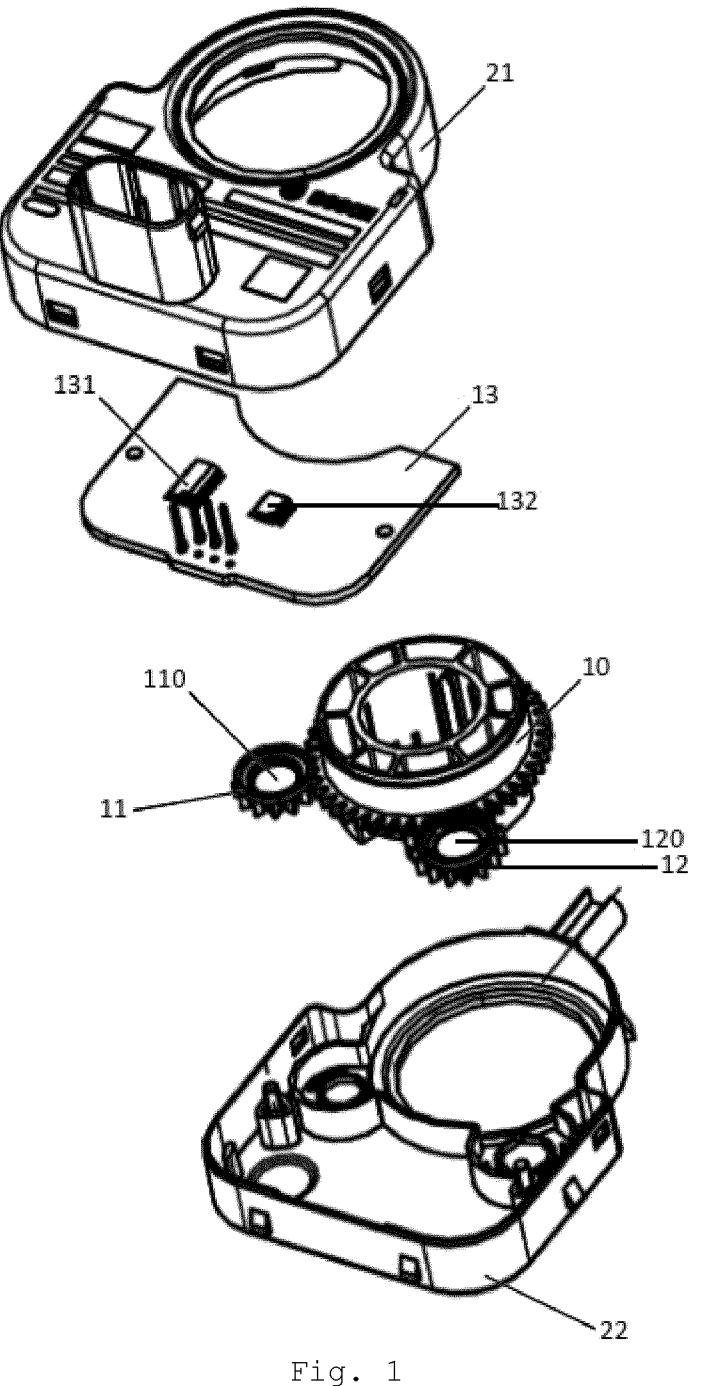
FIG. 1 is an exploded 3-D view of one embodiment of the steering angle sensor according to the present disclosure.
Figure 2:
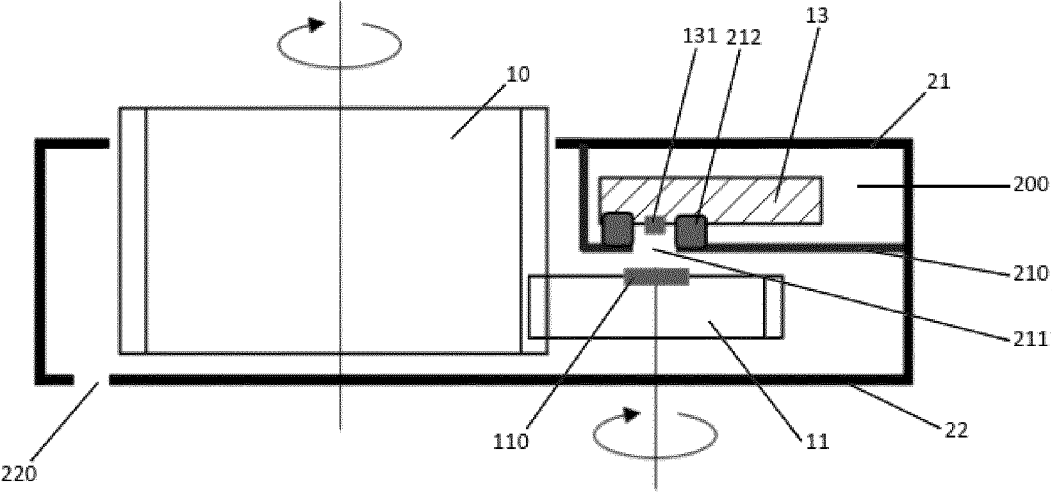
FIG. 2 is a cutaway view of the assembled steering angle sensor in FIG. 1.

As shown in FIGS. 1 and 2, the present embodiment is a steering angle sensor for measuring the rotation angle of an auto steering wheel and comprises a master gear 10 driven by the main rotating shaft (not shown) of the auto steering wheel, a first gear 11 and a second gear 12 meshed with the master gear, a printed circuit board 13, a first casing 21 and a second casing 22.

The first casing 21 and the second casing 22 are fixedly installed together, an accommodating space is formed between the two casings to accommodate the master gear 10, the first gear 11, the second gear 12 and the printed circuit board 13, the printed circuit board 13 is fixedly accommodated in the accommodating space, and the master gear 10 is rotatably connected with at least one of the first casing 21 and the second casing 22. In the present embodiment, the master gear 10 is rotatably connected with the first casing 21. The first gear 11 and the second gear 12 are rotatably accommodated in the accommodating space.

The master gear 10 is fixedly sleeve-connected to the main rotating shaft of the steering wheel, the first gear 11 is fixedly provided with a first magnet 110, the second gear 12 is fixedly provided with a second magnet 120, and the first magnet 110 and the second magnet 120 are respectively fixed onto the first gear 11 and the second gear 12 by use of injection or paste and respectively rotate together with the first gear 11 and the second gear 12. A first sensing chip 131, a second sensing chip 132 and a microprocessor (not shown) are arranged on the printed circuit board 13, and at least one of the first sensing chip 131 and the second sensing chip 132 is a giant magnetic sensing chip, for example. The first sensing chip 131 is arranged in correspondence to the first magnet 110 and the rotating angle of the first gear 11 is obtained by measuring the change of the magnetic field of the first magnet 110 fixed on the first gear 11. The second sensing chip 132 is arranged in correspondence to the second magnet 120 and the rotating angle of the second gear 12 is obtained by measuring the change of the magnetic field of the second magnet 120 fixed on the second gear 12. The first sensing chip 131 and the second sensing chip 132 are respectively electrically connected to the microprocessor and send the obtained rotating angles of the first gear 11 and the second gear 12 to the microprocessor. The microprocessor calculates the rotating angle of the master gear 10, namely, the rotating angle of the steering wheel, according to the received rotating angles of the first and second gears.

The first casing 21 is provided with an isolated space 200, and the printed circuit board 13 is fixedly installed in the isolated space 200. The isolated space 200 is used to isolate the printed circuit board 13 to prevent water from entering the isolated space 200 to damage the printed circuit board 13. The first casing 21 is fixedly provided with an isolating member 210, and the isolated space 200 is formed by the isolating member 210 and the first casing 21. The isolating member 210 may be integrated with the first casing 21 or may be a separately formed member, and is fixed onto the first casing 21 by use of at least one of a fastener, a paste, a screw and a groove, and the installation gap between the isolating member 210 and the first casing 21 may be sealed by use of rubber and the interference fit method (compressing the rubber) or may be sealed by use of glue and/or a seal strip. In the present embodiment, the isolating member 210 is a sheet having a roughly L-shaped cross-section. It should be understood that the isolating member 210 may be a sheet having an arbitrarily-shaped (for example, roughly U-shaped, semicircular, and/or curved) cross-section in other embodiments, as long as the isolating member 210 together with the first casing 21 can form an isolated space 200 preventing water. Alternatively, the isolating member 210 is provided with a through-hole 211 in the position corresponding to the first sensing chip 131 and the second sensing chip 132 to help the first sensing chip 131 and the second sensing chip 132 to measure the changes of the magnetic fields of the first magnet 110 and the second magnet 120. Alternatively, a sealing member 212 is provided between the isolating member 210 and the printed circuit board 13, and the sealing member 212 is made of silica gel, for example. The sealing member 212 is arranged around the through-hole 211 and extends to the printed circuit board 13 to prevent water from entering the isolating space 200 from the through-hole 211 to damage the printed circuit board 13.

Alternatively, at least one of the first casing 21 and the second casing 22 is provided with one or more drainage holes 220 according to the practical requirements to drain water between the first casing 21 and the second casing 22. In other embodiments, no drainage hole 220 may be provided.

The first casing is provided with an isolated space for accommodating the printed circuit board, thus preventing water from entering the steering angle sensor to damage the printed circuit board and guaranteeing that the steering angle sensor can work normally even in the case of water. Therefore, the steering angle sensor provided according to the design of the present disclosure has a wider scope of application than the prior art.

Although particular embodiments of the present disclosure are described, these embodiments are presented only by examples and are not intended to restrict the scope of the present disclosure. On the contrary, the structure described here may take on other forms. In addition, replacements and changes may be made to the structure, without departing from the spirit and scope of the present disclosure.

The invention claimed is:

1. A steering angle sensor for measuring a rotation angle of a motor vehicle steering wheel, comprising:
 a master gear driven by a main rotating shaft of the motor vehicle steering wheel;
 a first gear meshed with the master gear;
 a second gear meshed with the master gear;
 a printed circuit board;
 a first casing; and
 a second casing, the first casing and the second casing being fixedly installed together, wherein:
 an accommodating space is defined between the first and second casings to accommodate the master gear, the first gear, the second gear, and the printed circuit board,
 the master gear is rotatably connected with at least one of the first casing and the second casing,
 the first gear and the second gear are rotatably accommodated in the accommodating space,
 the first casing defines an isolated space in which the printed circuit board is fixedly installed, the first casing configured such that water is inhibited from entering the isolated space in such a way as to damage the printed circuit board,
 the first casing includes a fixed isolating member, and the isolated space is defined by the isolating member and the first casing,
 the isolating member is a separately formed member and is installed on the first casing to form the isolated space, and
 an installation gap between the isolating member and the first casing is sealed by use of rubber and an interference fit, or is sealed by use of glue and/or a seal strip.

2. The steering angle sensor according to claim 1, wherein the isolating member is fixed onto the first casing by at least one of a fastener, a paste, a screw and a groove.

3. The steering angle sensor according to claim 1, wherein a first sensing chip and a second sensing chip are arranged on the printed circuit board, and the isolating member defines a through-hole in a position corresponding to the first sensing chip and the second sensing chip.

4. The steering angle sensor according to claim 3, wherein a sealing member is arranged between the isolating member and the printed circuit board, and the sealing member is arranged around the through-hole.

5. The steering angle sensor according to claim 4, wherein the sealing member is formed of silica gel.

6. The steering angle sensor according to claim 1, wherein at least one of the first casing and the second casing defines a drainage hole.

7. The steering angle sensor according to claim 1, wherein the isolating member is a sheet having a roughly L-shaped, U-shaped, semicircular, and/or curved cross-section.

8. A steering angle sensor for measuring a rotation angle of a motor vehicle steering wheel, comprising:
 a master gear driven by a main rotating shaft of the motor vehicle steering wheel;
 a first gear meshed with the master gear;
 a second gear meshed with the master gear;
 a printed circuit board;
 a first casing; and
 a second casing, the first casing and the second casing being fixedly installed together, wherein:

an accommodating space is defined between the first and second casings to accommodate the master gear, the first gear, the second gear, and the printed circuit board, the master gear is rotatably connected with at least one of the first casing and the second casing, the first gear and the second gear are rotatably accommodated in the accommodating space, the first casing defines an isolated space in which the printed circuit board is fixedly installed, the first casing configured such that water is inhibited from entering the isolated space in such a way as to damage the printed circuit board, the first casing includes a fixed isolating member, and the isolated space is defined by the isolating member and the first casing, the isolating member is a separately formed member and is installed on the first casing to form the isolated space, and the isolating member is a sheet having a roughly L-shaped, U-shaped, semicircular, and/or curved cross-section.

9. The steering angle sensor according to claim 8, wherein an installation gap between the isolating member and the first casing is sealed by use of rubber and an interference fit, or is sealed by use of glue and/or a seal strip.

10. The steering angle sensor according to claim 8, wherein the isolating member is fixed onto the first casing by at least one of a fastener, a paste, a screw and a groove.

11. The steering angle sensor according to claim 8, wherein a first sensing chip and a second sensing chip are arranged on the printed circuit board, and the isolating member defines a through-hole in a position corresponding to the first sensing chip and the second sensing chip.

12. The steering angle sensor according to claim 11, wherein a sealing member is arranged between the isolating member and the printed circuit board, and the sealing member is arranged around the through-hole.

13. The steering angle sensor according to claim 12, wherein the sealing member is formed of silica gel.

14. The steering angle sensor according to claim 8, wherein at least one of the first casing and the second casing defines a drainage hole.

* * * * *